United States Patent [19]

Shimajiri et al.

[11] Patent Number: 5,786,444
[45] Date of Patent: Jul. 28, 1998

[54] TREATING METHOD FOR IMPROVING THE STRENGTH OF MOLDED PRODUCTS OF A THERMOSETTING RESIN

[75] Inventors: Kiyotaka Shimajiri; Shozo Honda; Hiroshi Mizoguchi, all of Toyama-ken, Japan

[73] Assignee: Sanko Gosei Kabushiki Kaisha, Toyama-ken, Japan

[21] Appl. No.: 805,738

[22] Filed: Feb. 25, 1997

Related U.S. Application Data

[63] Continuation of Ser. No. 375,807, Jan. 19, 1995, abandoned.

[30] Foreign Application Priority Data

Oct. 7, 1994 [JP] Japan ................. 6-281124

[51] Int. Cl.$^6$ .......................... C08F 6/00; C08G 3/00
[52] U.S. Cl. .............. 528/503; 528/499; 264/28; 264/237; 264/348; 264/328.4; 264/328.45; 264/528
[58] Field of Search .................. 528/503, 499; 264/237, 348, 328.14, 328.15, 528

[56] References Cited

U.S. PATENT DOCUMENTS

| | | | |
|---|---|---|---|
| 4,100,244 | 7/1978 | Nonaka | 264/211 |
| 5,270,444 | 12/1993 | Shiraki et al. | 528/499 |

FOREIGN PATENT DOCUMENTS 54-0056695  5/1979  Japan.

*Primary Examiner*—Duc Truong
*Attorney, Agent, or Firm*—Fulwider Patton Lee & Utecht, LLP

[57] ABSTRACT

A treating method for improving the strength of molded products. Molded products of a thermosetting resin containing a phenol resin as a main component are taken out of a mold of an injection molding machine, and then immediately immersed in water or exposed to blown air. With this treatment, the breaking strength, particularly the toughness of the molded products is increased. This method provides molded products having a large strength at room temperature as well as at temperatures around 120° C.

13 Claims, 6 Drawing Sheets

STRENGTH TEST ON FLANGE PORTION

STRENGTH TEST ON BORE PORTION

TREATING METHOD FOR IMPROVING THE STRENGTH OF MOLDED PRODUCTS OF A THERMOSETTING RESIN

This application is a continuation of application Ser. No. 08/375,807 filed Jan. 19, 1995, now abandoned.

BACKGROUND OF THE INVENTION

1. Field of the Invention

The present invention relates to a treating method for improving the strength of injection-molded products of a thermosetting resin containing a phenol resin as a main component.

2. Description of the Related Art

Injection-molded products of thermosetting resins are widely used. In a production process, such molded products are left in a room for natural cooling in the air after being taken out of a mold of an injection molding machine.

During such natural cooling, depending on the outside temperature, it takes about 1–2 hours to cool an injection-molded product to room temperature after removal from the mold. The strength, and particularly the toughness of naturally cooled injection-molded products is not sufficient. In particular, when such products are used in high-temperature atmosphere, such as at temperatures around 120° C., their toughness decreases, resulting in a considerably insufficient strength.

The applicant of the present invention has proposed, in Japanese Patent Application No. 5-123906 filed on May 26, 1993, a method of improving the strength of molded products so that molded products retain a sufficient toughness in a high-temperature atmosphere as well as at ambient temperatures. According to the proposed method, a molded product of a thermosetting resin is put in water or is subjected to atmospheric treatment to be humidified, or to be humidified and cooled.

As a result of various research and experiments, it has been found that the breaking strength such as the toughness of injection-molded products of a thermosetting resin can be improved by quickly cooling the molded products through exposure to a cooling medium such as a cooling liquid or cooling gas immediately after the molded products are taken out of a mold of an injection molding machine, instead of humidifying the injection-molded products. Compared to the above method proposed by the applicant, the work efficiency is higher, and molded products can become ready for use in a shorter time.

SUMMARY OF THE INVENTION

In view of the foregoing, it is an object of the present invention to provide a treating method for improving the strength of molded products of a thermosetting resin which is capable of increasing the breaking strength of the molded products by increasing their toughness.

Another object of the present invention is to provide a treating method for improving the strength of molded products of a thermosetting resin which is capable of increasing the work efficiency and making it possible to use molded products a short time after molding.

According to a first aspect of the present invention, a molded product of a thermosetting resin is taken out of a mold of an injection molding machine and then immediately immersed in water or other liquid for rapid cooling.

The quick immersion cools the surface portion of the molded product efficiently and improves the breaking strength, particularly the toughness of the molded product compared to conventional naturally cooled molded products. Thus, rapidly cooled molded products can be used at room temperature and at as high a temperature as about 120° C.

It is preferred that a molded product of a thermosetting resin taken out of a mold of an injection molding machine be subjected to a gate cutting operation and then immediately immersed in water having a temperature of 0 to 90° C. for several seconds to 180 seconds for rapid cooling.

In this case, the process can be efficiently performed by use of an automated machine. Particularly, when two or more molded products are simultaneously made in the mold, it becomes possible to immerse the molding products after they are separated from each other by gate cutting.

The time between removal of a molded product from the mold and immersion in water is about 40 seconds. The surface temperature of the molded product, therefore,-does not drop so much. Thus, it is sufficient for the molded product to be immersed in water for from several seconds up to 180 seconds (preferably 10–30 seconds) at 0° to 9° C. (preferably 20° to 25° C). The cooling time can be made shorter than that in conventional natural cooling. Moreover, in contrast with the aforementioned method proposed in Japanese Patent Application No. 5-123906, molded products are not humidified, and accordingly the time required for immersion in water can be shortened. Also, the drying time after immersion can be shortened.

According to a second aspect of the present invention, air or gas is blown at a molded product of a thermosetting resin for rapid cooling, immediately after the molded product is taken out of a mold of an injection molding machine.

Since the molded product is exposed to blown gas with a large temperature difference between the molded product and the gas, the surface portion of the molded product can be cooled relatively efficiently. Hence, the obtained breaking strength of the molded product can be made as high as molded products treated by the method according to the first aspect of the invention. Thus treated molded products can be used at room temperature and at temperatures around 120° C. Because of using gas for rapid cooling, a post-cooling process, i.e., drying process is not required in contrast with the immersion-in-water method. Thus, it is possible to shorten the preparation time before use.

It is preferred that a molded product be conveyed to a gate cutting station while the molded product be exposed to air blown at a temperature of −30° to 50° C. for 20–120 seconds for rapid cooling, and then be subjected to a gate cutting operation.

In this case, the molded product can be rapidly cooled in the state where a very large difference in temperature exists between the molded product and air. Accordingly, the molded product can be cooled efficiently in a short time, leading to a good work efficiency.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawing, in which.

DESCRIPTION OF THE PREFERRED EMBODIMENTS

Embodiments of the present invention will now be described with reference to the accompanying drawings.

A first embodiment to be described employs a treating method according to the first aspect of the present invention.

Figure 1:
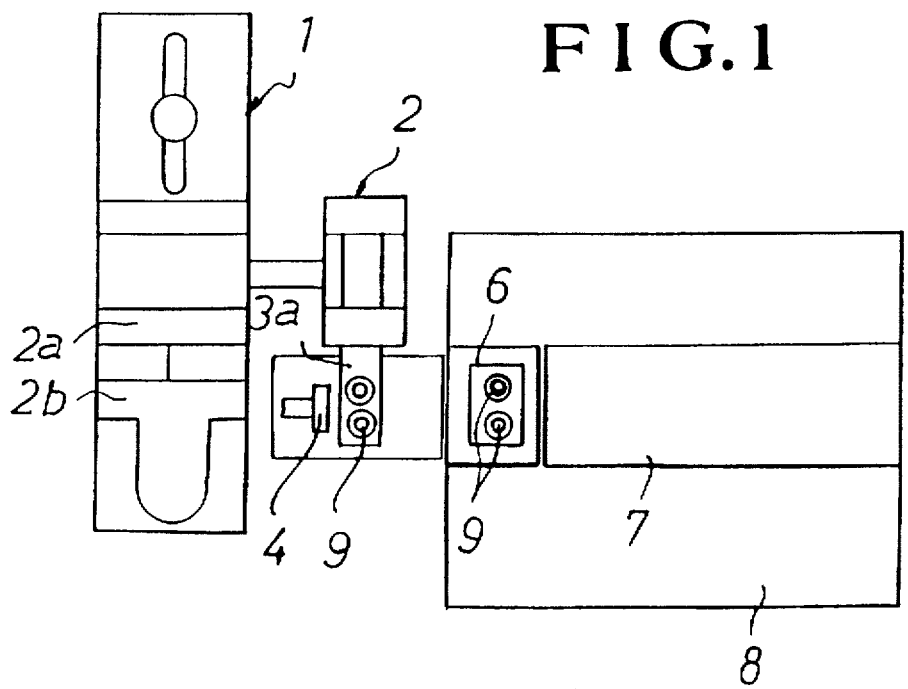
FIG. 1 is a schematic plan view of an injection molding machine and a treating apparatus which carries out a treating method according to a first embodiment of the present invention for improving the strength of molded products of a thermosetting resin.
Figure 2:
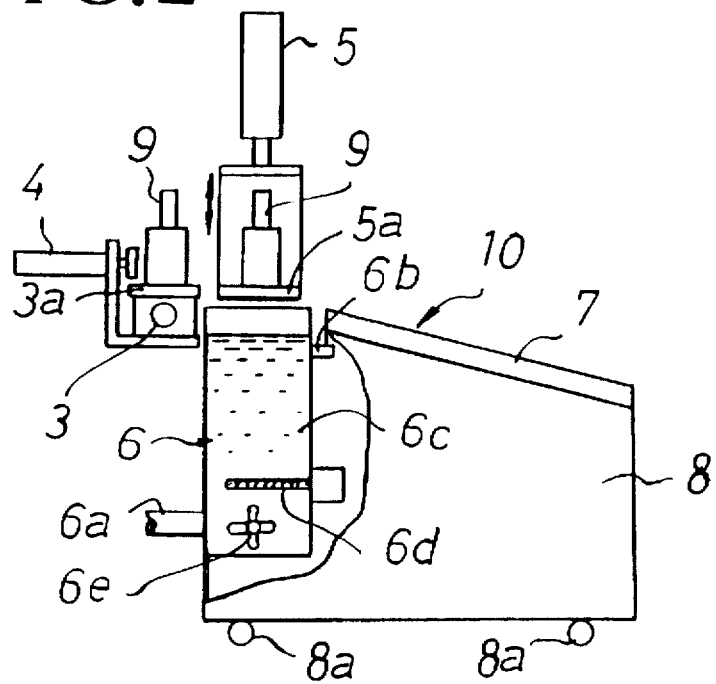
FIG. 2 is a partially sectioned schematic side view of the treating apparatus of FIG. 1.

In FIGS. 1 and 2, reference numeral 1 denotes a mold of an injection molding machine and 2 denotes a gate cutter, both of which are of conventional design. Reference numeral 3 denotes a transfer cylinder mechanism, 4 denotes a loading cylinder mechanism, 5 denotes a lifting cylinder mechanism, 6 denotes a cooling device, and 7 denotes a chute, all of which constitute a treating apparatus 10. In the cooling device 6, a heater 6d and stirring blades 6e of a stirrer are mounted in a water tank 6c having a water supply pipe 6a and an overflow pipe 6b. The stirring blades 6e are rotated by a motor (not shown). Reference numeral 8 denotes a cart having casters 8a. The above-described lifting cylinder mechanism 5, cooling device 6 and chute 7 are disposed on the cart 8. Reference numeral 9 denotes molded products.

Figure 3:
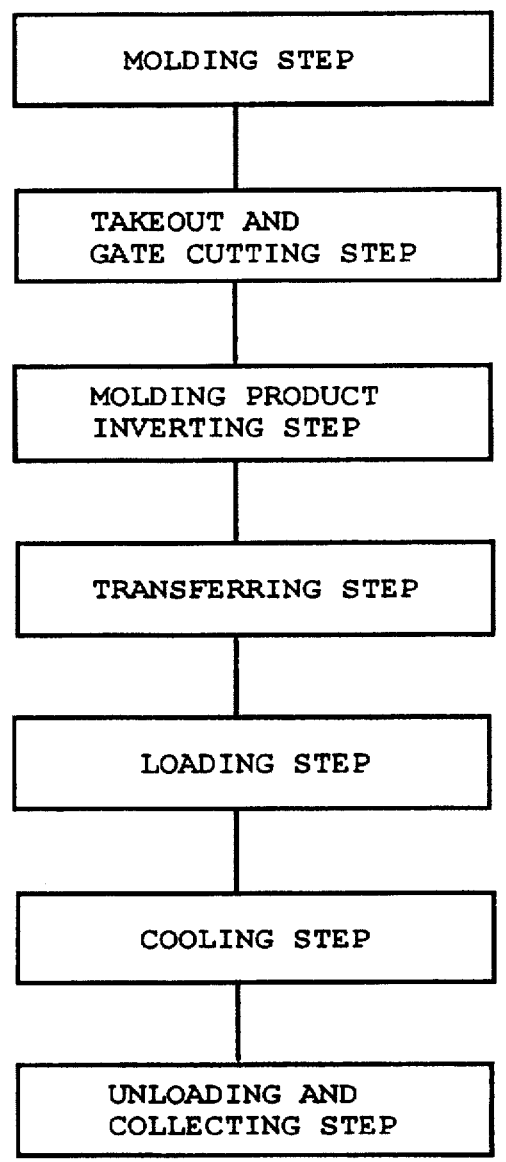
FIG. 3 is a process flowchart illustrating the treating method according to the first embodiment of the present invention.

The treating method according to the present embodiment will now be described with reference to FIG. 3.

(1) In a molding step, a thermosetting resin is injected into two cavities in a mold installed in the injection molding machine 1. The thermosetting resin is previously prepared by adding fillers such as wood dust and glass fiber to a main component such as a phenol resin. Two molded products are formed in this step.

(2) In a takeout and gate cutting step, an automatic removing machine removes the molded products 9 from the injection molding machine 1 and sends them to the gate cutter 2. The gate cutter 2 cuts gates to separate the two molded products 9 from each other. The molded products are deburred, as needed.

(3) The separated two molded products 9 are turned upside down by appropriate means in a molded product inverting step and then placed on a holder 3a of the transfer cylinder mechanism 3.

(4) In a transferring step, the transfer cylinder mechanism 3 causes one end of the holder 3a to face the loading cylinder mechanism 4. At this time, a lifting body 5a of the lifting cylinder mechanism 5 is in the up position of its lifting stroke. Therefore, the other end of the holder 3a is opposed to the lifting body 5a.

(5) In a loading step, the loading cylinder mechanism 4 loads the molded products 9 onto the lifting body 5a.

(6) In a cooling step, the lifting cylinder mechanism 5 operates so as to immerse the molded products 9 together with the lifting body 5a in water in the water tank 6c of the cooling device 6. Water in the water tank 6c is maintained at a temperature of 20° to 60° C., preferably 20° to 25° C. The molded products 9 are immersed in water for several seconds to 180 seconds, and preferably 10–30 seconds, for rapid cooling.

(7) In an unloading and collecting step, the lifting cylinder mechanism 5 operates so as to lift the molded products 9 together with the lifting body 5a from water, back to the original position. When the lifting body 5a stops at the original position, the cooled molded products 9 are moved to the upper end of the chute 7 by appropriate means. The molded products 9 slide down the chute and are collected in an appropriate container (not shown) as products. The collected products are naturally cooled until the entirety thereof cools down and hardens.

In the treatment described above, when the water temperature is below 20° C. at start-up of the treating apparatus, the heater 6d is turned on to raise the water temperature in the water tank 6c to 20° to 25° C. Once cooling the molded products 9 starts, the water temperature rises. Hence, cold water is fed into the water tank 6c through the water supply pipe 6a, and water warmed by the molded products 9 is drained through the overflow pipe 6b, thereby maintaining water in the water tank 6 at a temperature of 20° to 60° C., preferably 20° to 60° C. The stirring blades 6e are rotated to make the water temperature substantially uniform throughout the water tank 6a.

One cart takes care of the cooling of molded products obtained from a plurality of injection molding machines. The timing of operations is varied among the injection molding machines such that removal of molded products, gate cutting, and cooling take place at different times in different ones of the injection molding machines. The cart is moved to a mold of an injection molding machine from which molded products are to be cooled.

According to the first embodiment, two molded products are concurrently made by the mold in the injection molding machine and are gate cut by the gate cutter. Then, the molded products are turned upside down and placed onto the holder of the transfer mechanism. The molded products are loaded onto the lifting body of the lifting cylinder mechanism. The lifting body is lowered to immerse the molded products into water in the water tank. A series of the steps takes about 40 seconds. Hence, when the molded products have a surface temperature of 180° C. immediately after being taken out of the mold, the surface temperature of the molded products drops to a temperature of about 150° C. immediately before being immersed in water. That is, without getting too cold, the molded products are immersed in water for several seconds to 180 seconds, preferably 10–60 seconds, thereby cooling the surface portion of the molded products in a short time.

As described above, since the surface temperature of water cooled molded products is lower than that of naturally cooled molded products, the water cooled molded products cool down and harden sufficiently in a shorter time.

A certain period of time elapses before carrying out immersion due to the gate cutting and other steps. However, if the surface temperature of the molded products is 150° to 130° C. before immersion, the strength of the products can be improved by immersing them in water having a temperature of 20° to 25° C. Particularly, the toughness of the molded products can be maintained at a sufficient level at room temperature as well as at temperatures around 120° C. Also, breaking strength can be improved. Using ionic water will provide better results.

For molded products which contains a phenol resin as a main component, it is preferred that immersion be carried out in water having a temperature of 20° to 25° C. for 10–60 seconds. If the water temperature drops below 20° C., molded products may crack. If the water temperature exceeds 25° C., the cooling time will increase, and the efficiency of treatment will drop without an improvement in strength. If the time of immersion is shorter than 10 seconds, an improvement in strength will become small. Also, even when the immersion time exceeds 60 seconds, the efficiency of treatment will merely drop without an improvement in warp strength.

The thus obtained products are naturally cooled until the entirety thereof cools down and hardens, and the products are left until they dry. In contrast with the aforementioned method proposed in Japanese Patent Application No. 5-123906, the products are not humidified, and hence the time of drying can be made shorter.

Next, a second embodiment will be described. The second embodiment employs a treating method according to the second aspect of the present invention.

Figure 4:
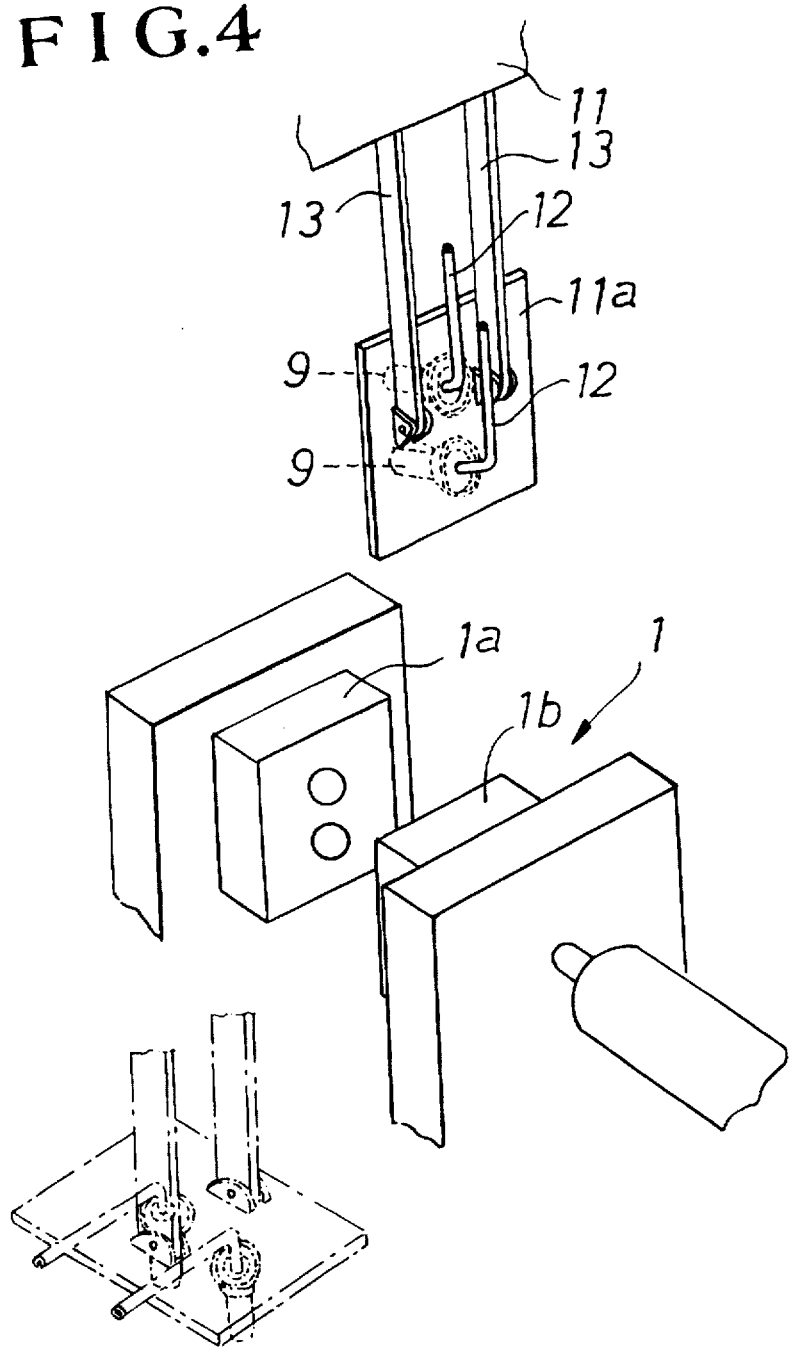
FIG. 4 is a perspective view of the essential portions of an injection molding machine and a treating apparatus which carries out a treating method according to a second embodiment of the present invention for improving the strength of molded products of a thermosetting resin.

In FIG. 4 which shows a treating apparatus according to the second embodiment, the same portions as in FIGS. 1 and 2 are represented by the same reference numerals. An automatic removing device 11 removes the molded products 9 from molds 1a, 1b of the injection molding machine 1. A removing plate 11a is attached to arms 13 of the automatic removing device 11. Tips of a pair of air nozzles 12 are fixed to the removing plate 11a. Base ends of the air nozzles 12 are connected to the discharge port of an air compressor (not shown). Air fed by the compressor is jetted from the air nozzles 12 to the molded products 9.

Figure 6:
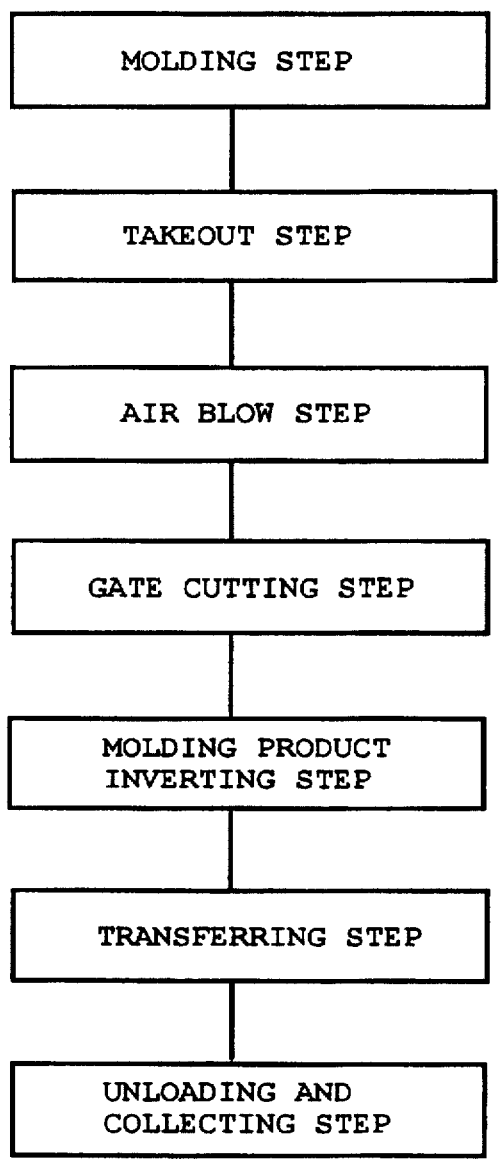
FIG. 6 is a process flowchart illustrating the treating method according to the second embodiment of the present invention.

The treating method according to the second embodiment will be described with reference to FIG. 6.

(1) In a molding step, as in the first embodiment, a thermosetting resin containing a phenol resin as a main component is injected into two cavities in the mold, thereby making two molded products.

(2) In a takeout or removing step, the molds 1a, 1b fixed to the injection molding machine 1 open, and the automatic removing device 11 operates so as to take out the removing plate 11a from the injection molding machine 1, with two molded products 9 held thereon. Then, the removing plate 11a changes its position from a vertical position as indicated by a solid line in FIG. 4 to a horizontal position as indicated by a dash-and-dot line in the same figure and is set on a gate cutter.

Figure 5:
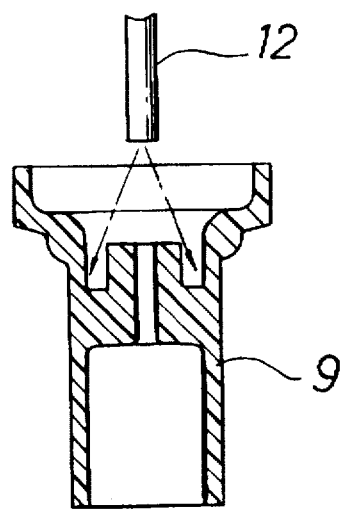
FIG. 5 is a partial view illustrating an air blow in the treating apparatus of FIG. 4.

(3) In a cooling step, cooling starts immediately after the removing plate 11a is retracted from the molds 1a, 1b. While the molded products 9 are transferred to a gate cutting station, air having a pressure of 3–5 kg/cm², which is supplied from the air compressor (not shown), is jetted from two air nozzles 12 against the molded products 9 as shown in FIG. 5. The air has a temperature of 15° to 20° C. and is blown for 20–120 seconds. The air cools the molded products rapidly. Then, the air blow is stopped to complete the cooling step.

(4) In a gate cutting step, a gate cutter at the gate cutting station cuts gates of the molded products to make two separate molded products. The molded products are deburred, as needed.

(5) In a molded product inverting step, two molded products are turned upside down.

(6) In a transferring step, the inverted molded products are transferred onto a conveyor or the like without cooling.

(7) In an unloading and collecting step, the air cooled molded products are unloaded as products from the conveyor and collected in an appropriate container. Then, the collected products are naturally cooled for use until the entirety thereof cools down and hardens. Since the molded products are not immersed in water, a drying step is not required, thus making it possible to use the products in a short time.

According to the second embodiment, two molded products are concurrently made in the mold of the injection molding machine. While the molded products are taken out of the mold and then transferred to the gate cutter, air which has a temperature of 15° to 20° C. (room temperature) and a pressure of 3–5 kg/cm² and is supplied from the compressor is jetted from nozzles against the molded products for 20–120 seconds. Then, the molded products are subjected to a gate cutting operation to become two separate molded products.

When the molded products have a temperature of 180° C. immediately after being taken out of the mold, the temperature hardly drops before air blowing at a temperature of 15° to 20° C. starts. While the molded products are transferred, the air blowing continues for 20–120 seconds. Hence, even by air cooling, because of the large temperature difference between the molded products and air, the surface portion of the molded products can be cooled in a short time.

Compared to naturally cooled molded products, the molded products cooled by blown air have a lower surface temperature, and hence cool down and harden sufficiently in a shorter time. Similar to water cooled molded products according to the first embodiment, the strength of the air cooled molded products improves, and also the breaking strength at room temperature and at temperatures around 120° C. improves.

For molded products containing a phenol resin as a main component, if the time of air blowing is shorter than 20 seconds, the strength will not improve so much. Also, even when the length of air blowing exceeds 120 seconds, the efficiency of treatment will drop without an improvement in strength.

In the second embodiment, since air is jetted from a nozzle, air may be intensively jetted against a specific portion (a weak portion) such as a bore portion of the molded product 9 for rapid cooling thereof (see FIG. 5).

Figure 7:
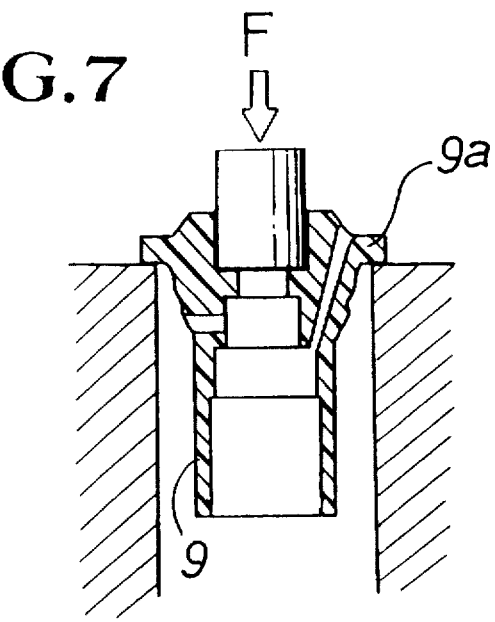
FIG. 7 is a view illustrating a method of testing the flange portion of a molded product.
Figure 8:
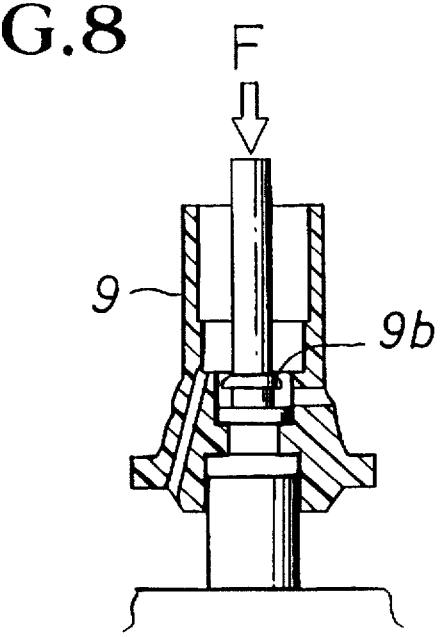
FIG. 8 is a view illustrating a method of testing the bore portion of the molded product.

The first and second embodiments will now be described using a specific example, i.e., a valve body (see FIGS. 7 and 8) for use with a brake assistor mounted in an engine compartment of an automobile. Two valve bodies are jointly formed from a molding material containing a phenol resin as a main component. The joined valve bodies are separated from each other and naturally cooled to obtain conventional molded products A. Water-cooled molded products according to the first embodiment are indicated as B, C and D. Air-cooled molded products according to the second embodiment are indicated as E, F and G. A strength test was performed on molded products A through G. Specifically, their circular flange portion 9a and bore portion 9b were pressed at a test speed of 3 mm/min at room temperature. The test results are shown in the following tables.

TABLE 1

| | Flange portion (kgf) | | | | | | |
|---|---|---|---|---|---|---|---|
| | A | B | C | D | E | F | G |
| Average | 1497 | 1834 | 1903 | 2172 | 1500 | 1628 | 1652 |
| Maximum | 1857 | 2002 | 2176 | 2399 | 1642 | 1812 | 1808 |
| Minimum | 1226 | 1598 | 1642 | 2035 | 1343 | 1404 | 1517 |

TABLE 2

| | Bore portion (kgf) | | | | | | |
|---|---|---|---|---|---|---|---|
| | A | B | C | D | E | F | G |
| Average | 2087 | 2494 | 2684 | 2758 | 2146 | 2212 | 2365 |
| Maximum | 2225 | 2795 | 2872 | 2892 | 2310 | 2460 | 2597 |
| Minimum | 1998 | 2075 | 2367 | 2642 | 1873 | 1946 | 2087 |

Moldings A through G included 10 pieces each.

Effects obtained at 120° C. are equivalent to those at room temperature.

The present invention is not limited to the molding of the above described valve bodies, but may be applied to molding for various parts such as fixing devices used in laser printers. Also, the present invention is not limited to the molding using a material containing a phenol resin as a main component, but may be applied to molding using other thermosetting resins containing melamine, epoxy resin, unsaturated polyester resin or the like as a main component.

As for the form of molded products, the present invention is not limited to 2-piece molded product, but may be applied to 1-piece molded product and 3 or more-piece molded product.

A liquid tank for immersing molded products therein and a chamber for treating molded products are not limited to the mobile type as for the first embodiment, but may be stationary.

Liquid or gas used for cooling may have a stepped or continuous temperature gradient such that the temperature of the liquid or gas decreases as the surface temperature of a molded product drops from a temperature immediately after molding to room temperature. The cooling liquid is not limited to water, but may be oil or other aqueous solutions. Also, the cooling gas is not limited to air, but may be carbon dioxide gas or the like. From the viewpoint of cost and easy usage, water and air are preferable.

The method of the present invention may be practiced such that as soon as a molded product is taken out of a mold of an injection molding machine and is subjected to a gate cutting process, the molded product is immersed in water having a temperature of 0° to 90° C. for several seconds to 180 seconds for rapid cooling.

Also, the method of the present invention may be practiced such that while a molded product taken out of a mold of an injection molding machine is transferred to a gate cutting station, the molded product is exposed to air blown at a temperature of −30° to 50° C. for 20–120 seconds for rapid cooling, and then subjected to a gate cutting operation at the gate cutting station.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for improving the strength of a product molded from thermosetting resin, said method comprising the steps of:

forming a molded product from thermosetting resin in a mold of an injection molding machine;

removing said newly molded product from the mold; and cooling said molded product by contacting said molded product with a cooling fluid before said molded product substantially cools so that said molded product is quickly cooled, and is thereby increased in strength.

2. The method for improving the strength of a product molded from thermosetting resin of claim 1, wherein the cooling fluid is water having a temperature between 0° C. and 90° C., and said molded product is immersed in the water for between 10 seconds and 180 seconds.

3. The method for improving the strength of a product molded from thermosetting resin of claim 1, wherein the cooling fluid is water having a temperature between 20° C. and 25° C., and said molded product is immersed in the water for between 10 and 60 seconds.

4. The method for improving the strength of a product molded from thermosetting resin of claim 1, wherein the thermosetting resin comprises phenol resin as a main component.

5. The method for improving the strength of a product molded from thermosetting resin of claim 2, wherein said molded product is subjected to a gate cutting operating after being removed from the mold and prior to being immersed in the cooling water.

6. A method for improving the strength of a product molded from thermosetting resin, said method comprising the steps of:

forming a molded product from thermosetting resin in a mold of an injection molding machine;

removing the molded product from the mold; and beginning to blow a cooling gas over said molded product before it begins to substantially cool in order to rapidly cool said molded product, to thereby impart it with added strength.

7. The method for improving the strength of a product molded from thermosetting resin of claim 6, wherein the cooling gas comprises air.

8. The method for improving the strength of a product molded from thermosetting resin of claim 6, wherein the cooling gas comprising air at a temperature of −30° C. to 50° C. is blown at said molded product for 20 to 120 seconds.

9. The method for improving the strength of a product molded from thermosetting resin of claim 6, wherein the cooling gas is blown at said molded product while said molded product is transferred from the injection molding machine to a gate cutting station where said molded product is subjected to a gate cutting operation.

10. The method for improving the strength of a product molded from thermosetting resin of claim 6, wherein the thermosetting resin comprises phenol resin as a main component.

11. The method of claim 1, wherein the cooling fluid is a cooling gas having a temperature between 15° C. and 20° C., and said cooling gas is blown over said molded product for between 20 and 120 seconds.

12. The method of claim 2, wherein the cooling gas comprises air.

13. A method for improving the strength of a product molded from thermosetting resin, said method comprising the steps of:

molding a thermosetting resin in a mold of an injection molding machine to form a thermosetting resin molded product;

removing said thermosetting resin molded product from the mold; and cooling said thermosetting resin molded product by contacting said thermosetting resin molded product with a cooling fluid at a temperature of between −30° C. and 90° C. for a period of between about 10 and 180 seconds beginning before said thermosetting resin molded product has substantially cooled, thereby quickly cooling said thermosetting resin molded product to increase the strength of said thermosetting resin molded product.

* * * * *